W. H. BOEHLER.
FOCUSING ATTACHMENT FOR CAMERAS.
APPLICATION FILED FEB. 8, 1912.
1,070,005.
Patented Aug. 12, 1913.
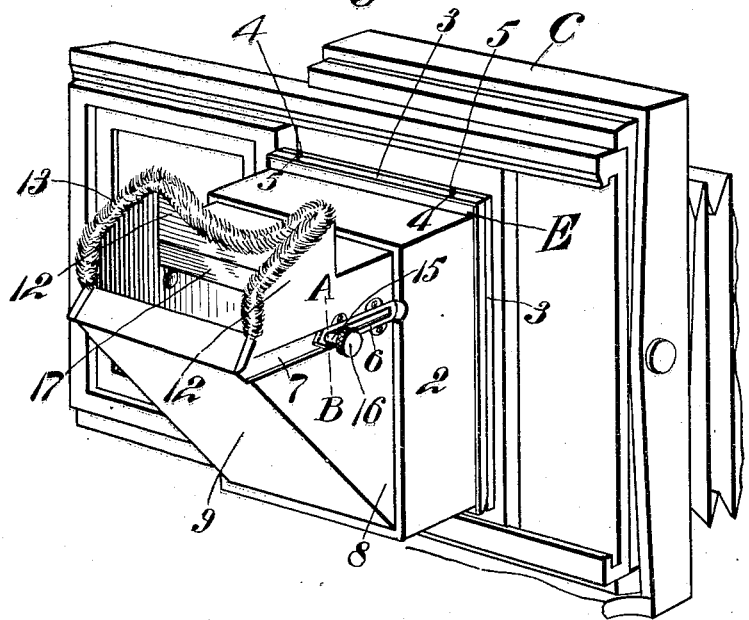
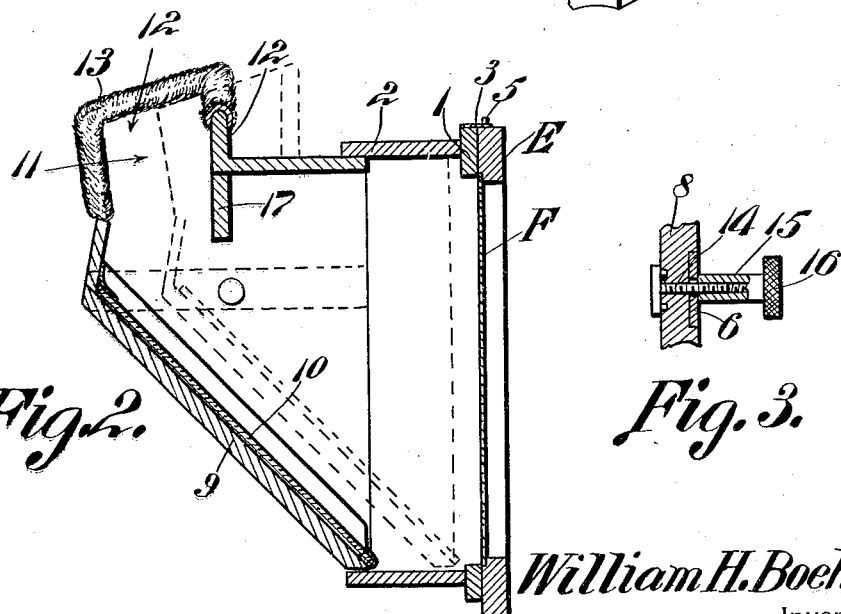
William H. Boehler,
Inventor

UNITED STATES PATENT OFFICE.

WILLIAM HENRY BOEHLER, OF TIFFIN, OHIO.

FOCUSING ATTACHMENT FOR CAMERAS.

1,070,005. Specification of Letters Patent. Patented Aug. 12, 1913.

Application filed February 8, 1912. Serial No. 676,393.

*To all whom it may concern:*

Be it known that I, WILLIAM H. BOEHLER, a citizen of the United States, residing at Tiffin, in the county of Seneca and State of Ohio, have invented a new and useful Focusing Attachment for Cameras, of which the following is a specification.

This invention relates to focusing attachments for cameras and is more particularly designed for use in connection with portrait cameras.

One of the objects of the invention is to provide a simple, durable and inexpensive attachment of this character which can be easily applied to the frame of the ground glass screen, said attachment including a mirror so disposed that the image appearing on the screen will be reflected right side up, this being of considerable advantage in obtaining the proper effect, particularly when using a vignetter.

A further object is to provide an attachment of this type which dispenses with the use of the focusing cloth commonly employed and which permits the image to be viewed by a person standing upright.

A further object is to provide a focusing attachment the mirror of which is adjustable relative to the screen thereby to change the reading distances to suit the focuses of the operators and to allow the mirror to be adjusted to the intensity of the light. For example, on a bright day when the light is strong, the mirror can be set back from the screen to get the best results, whereas, on a dark day the image can be viewed more clearly by adjusting the mirror closer to the screen.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the attachment in position upon the frame of the screen of a studio camera, a portion of the camera being shown in perspective. Fig. 2 is a vertical longitudinal section through the attachment, one of its positions, when adjusted, being indicated by dotted lines. Fig. 3 is a transverse section, on an enlarged scale, through a portion of the attachment, said section being taken on the line A—B Fig. 1.

Referring to the figures by characters of reference C designates a portion of a camera having the usual sliding carriage D to which is connected the frame E of the screen F formed of ground glass.

The attachment constituting the present invention comprises a frame 1 formed at one end of a box 2, said frame having a flange 3, preferably formed of metal, extending from the top and sides thereof and provided, in its upper portion, with openings 4 designed to receive pins 5 extending upwardly from the frame E of the focusing screen F. When the frame 1 of the attachment is placed against the frame E of the focusing screen, the flanges 3 will fit tightly against the top and side edges of the frame E and, as the pins 5 project through the openings 4, it will be seen that the frame 1 of the attachment will thus be caused to rest firmly against the outer face of the frame of the focusing screen. To disconnect the attachment from the screen it is merely necessary to lift it so as to remove the upper flange 3 from engagement with the pins 5.

Longitudinally slotted guide strips 6 are secured to the inner faces of the sides of box 2 and extend rearwardly therefrom. These strips are adapted to project into grooves 7 formed within the side walls of an adjustable box-like section 8 which is slidably fitted within the box 2. The bottom of the section 8 is preferably inclined, as shown at 9, and supports a mirror 10 arranged at 45 degrees to the screen F, this mirror being secured to the bottom 9 in any preferred manner, so as to be held against displacement relative thereto. A sight opening 11 is formed in the section 8 between the upper end of the bottom 9 and the rear end of the top of the section, this sight opening being surrounded by flanges 12 constituting an eye shield, the said flanges being preferably provided with a cushion 13 or the like adapted to contact with the face of the operator using the attachment.

Trunnions extend laterally from the section 8, as indicated at 14, and are screw threaded. These trunnions project through the slots in the guide strips 6 and are engaged by interiorly screw threaded clamping sleeves 15 having heads 16 whereby the said sleeves can be rotated so as to feed against and clamp upon the strips 14 and thus cause the strips to bind tightly against the section 8 and thereby hold said section against movement relative to the box 2.

It will be apparent the image appearing on the screen F can be viewed by looking downwardly through the opening 11 onto the mirrow 10. This mirror will reflect the image right side up and it is therefore possible to obtain better effects where a vignetter is employed than where the image is inverted. By loosening the clamping sleeve 15, the section 8 can be adjusted toward or away from the screen F so as to obtain the proper reading distance for the operator. Furthermore, as hereinbefore explained, this adjustment of the mirror 10 enables the image to be seen to best advantage on either a bright or a dark day.

Referring particularly to Fig. 2 it will be seen that the shield 17 extends downwardly into the upper portion of the section 8 and extends slightly below the horizontal plane occupied by the upper edge of the bottom 9. Thus it will be seen that light objects, such as a shirt or collar worn by the operator, will not reflect light against the screen F.

What is claimed is:—

1. The combination with a camera and a focusing screen frame mounted to slide laterally upon the back of the camera, of a frame detachably connected to the frame of the focusing screen, a box-like extension upon said detachable frame, a box-like section slidably mounted within the extension and having an inclined bottom, a mirror supported by said inclined bottom and shiftable therewith toward or from the screen frame, there being a sight opening in the movable section between the upper end of the inclined bottom and the rear end of the top of the movable section.

2. The combination with a camera and a focusing screen frame adjustable transversely of the back of the camera, of a frame detachably mounted upon the screen frame, a box-like extension upon the detachable frame, a box-like section slidable within said extension and having an inclined bottom, a mirror supported by said bottom, there being a sight opening in the top of said section and at the upper end of the bottom, upstanding flanges at the edges of the sight opening, and coöperating means upon the extension and the sides of the movable section for securing said section against movement.

3. The combination with a camera and a focusing screen frame adjustable transversely of the back of the camera, of a frame detachably mounted upon the screen frame, a box-like extension upon the detachable frame, a box-like section slidable within said extension and having an inclined bottom, a mirror supported by said bottom, there being a sight opening in the top of said section and at the upper end of the bottom, slotted strips extending from the extension, there being side grooves within the movable section and constituting seats for the strips, and means carried by the movable section for slidably engaging and for binding upon the slotted strips to hold the section against movement relative to the extension.

In testimony that I claim the foregoing as my own, I have hereto affixed my signature in the presence of two witnesses.

WILLIAM HENRY BOEHLER.

Witnesses:
ROBERT E. BOEHLER,
PHILIP H. REIF.